D. H. BELL.
COMBINED HOE AND RAKE.
APPLICATION FILED AUG. 28, 1915.
1,174,804.
Patented Mar. 7, 1916.
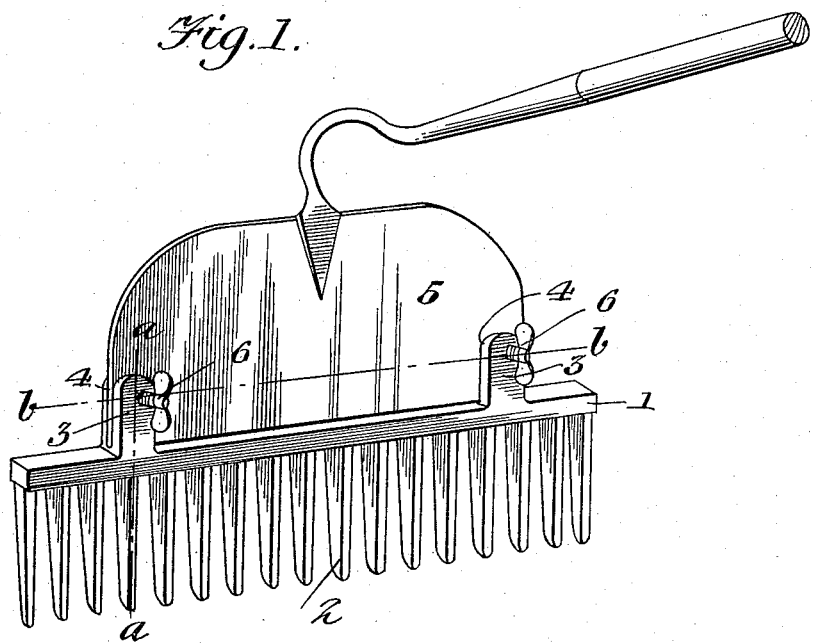
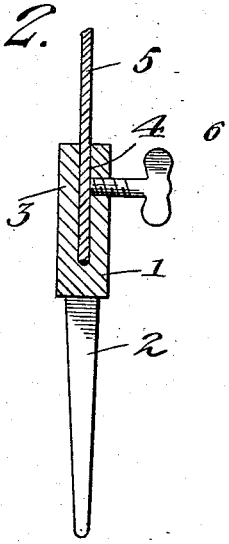
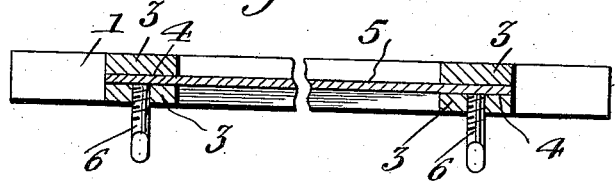
Witness
F. Windridge
Inventor
David H. Bell
By Victor J. Evans
Attorney

UNITED STATES PATENT OFFICE.

DAVID H. BELL, OF COALWOOD, WEST VIRGINIA.

COMBINED HOE AND RAKE.

1,174,804.　　　　Specification of Letters Patent.　　Patented Mar. 7, 1916.

Application filed August 28, 1915. Serial No. 47,810.

*To all whom it may concern:*

Be it known that I, DAVID H. BELL, a citizen of the United States, residing at Coalwood, in the county of McDowell and State of West Virginia, have invented new and useful Improvements in Combined Hoes and Rakes, of which the following is a specification.

This invention is an improved rake which is especially adapted to be attached to and used in connection with a hoe so that the hoe handle can also be utilized as a rake handle and the rake can be very cheaply manufactured without a handle and can be securely and in an instant attached to the blade of a hoe and used in connection with the hoe and thus enable both a hoe and a rake to be employed with the same handle.

The invention consists in the construction, combination and arrangement of devices hereinafter described and claimed.

In the accompanying drawings:—Figure 1 is a perspective view of a rake constructed in accordance with my invention, showing the same attached to the blade of and arranged for use in connection with a hoe. Figs. 2—3 are detail sectional views of the same respectively on the planes indicated by the lines *a—a* and *b—b* of Fig. 1.

My improved rake comprises a bar or head 1, teeth 2 which project from one side thereof, and lugs 3 which project from the opposite side of the bar or head. These lugs are each provided with a slot 4 for the reception of the blade 5 of a hoe and adapt the rake to be attached to the hoe blade and used in connection therewith. A set screw 6 is provided in a threaded opening in each lug for clamping the hoe blade and coacting with the lugs in securely and yet detachably fastening the rake to the hoe. It will be noted that my improved rake is not provided with means for attaching a handle thereto, the rake being adapted only for use in connection with a hoe or other like implement and for attachment directly to the blade of the hoe. This enables the rake to be manufactured without a handle, so that it can be very cheaply produced and can be sold at a very low price.

When it is desired to use the rake the arm can be readily attached, in an instant, to a hoe blade and then used in the ordinary way, the handle of the hoe serving as the handle for the rake and the hoe blade not interfering with the operation of the rake as such.

Having thus described my invention, I claim:—

A rake for use in connection with a hoe or the like and comprising a bar or head, teeth projecting from one side thereof, slotted lugs projecting from the other side of the rake or head and adapted to receive a hoe blade in their slots and clamping screws in said lugs to secure them to the hoe blade.

In testimony whereof I affix my signature in presence of two witnesses.

DAVID H. BELL.

Witnesses:
　C. K. HOLT,
　J. N. FORBES.

Copies of this patent may be obtained for five cents each, by addressing the "Commissioner of Patents, Washington, D. C."